(12) United States Patent
El Eglick (10) Patent No.: US 10,609,343 B2
(45) Date of Patent: Mar. 31, 2020

(54) AREA DISPLAY SYSTEM

(71) Applicant: Dan El Eglick, Eilat (IL)

(72) Inventor: Dan El Eglick, Eilat (IL)

( * ) Notice: Subject to any disclaimer, the term of this patent is extended or adjusted under 35 U.S.C. 154(b) by 0 days.

(21) Appl. No.: 16/088,089

(22) PCT Filed: Oct. 16, 2017

(86) PCT No.: PCT/IL2017/051144
§ 371 (c)(1),
(2) Date: Sep. 25, 2018

(87) PCT Pub. No.: WO2018/083688
PCT Pub. Date: May 11, 2018

(65) Prior Publication Data
US 2019/0110027 A1     Apr. 11, 2019

(30) Foreign Application Priority Data

Nov. 3, 2016   (IL) .......................................... 248749

(51) Int. Cl.
| | | |
|---|---|---|
| *H04N 7/18* | (2006.01) | |
| *G06K 9/00* | (2006.01) | |
| *H04W 4/024* | (2018.01) | |
| *H04W 4/029* | (2018.01) | |
| *H04N 5/265* | (2006.01) | |

(52) U.S. Cl.
CPC ......... *H04N 7/185* (2013.01); *G06K 9/00637* (2013.01); *G06K 9/00671* (2013.01); *H04N 5/265* (2013.01); *H04W 4/024* (2018.02); *H04W 4/029* (2018.02)

(58) Field of Classification Search
CPC combination set(s) only.
See application file for complete search history.

(56) References Cited

U.S. PATENT DOCUMENTS

| | | | | |
|---|---|---|---|---|
| 9,664,525 | B2 * | 5/2017 | Dimitriadis | ........ G01C 21/3415 |
| 2010/0074555 | A1 * | 3/2010 | Diaz | .................. G06K 9/00637 |
| | | | | 382/284 |
| 2014/0236468 | A1 * | 8/2014 | Dave | ..................... H04W 4/029 |
| | | | | 701/300 |
| 2014/0300621 | A1 | 10/2014 | Kim | |
| 2015/0078624 | A1 | 3/2015 | Fukuda | |

(Continued)

FOREIGN PATENT DOCUMENTS

| | | |
|---|---|---|
| EP | 2672231 A2 | 12/2013 |
| JP | 2005056186 A | 3/2005 |

(Continued)

*Primary Examiner* — Janese Duley
(74) *Attorney, Agent, or Firm* — Alphapatent Associates, Ltd.; Daniel J. Swirsky (57) ABSTRACT

An area display system (10), including: at least one flying camera (54), for producing a picture (56A) of at least one area (12A) for at least two specific times (40A, 40B); a social network geographical navigation application (60), for obtaining locations (16A2, 16C2) of objects (16A1, 16C1) via broadcasting smartphones (52A) thereof, roaming in the at least one area (12A); and a processor, for deleting regions (50A, 50B) from the picture (56A) being different in the at least two specific times (40A, 40B), and for inserting a symbol (16A3) for each of the roaming objects (16A1) into the picture (56A), conforming to the location (16A2) thereof.

4 Claims, 9 Drawing Sheets

(56) References Cited

U.S. PATENT DOCUMENTS

2015/0228194 A1    8/2015  Nomura
2015/0286868 A1   10/2015  Flores et al.
2019/0246238 A1*  8/2019  Crutchfield ......... G06F 3/04817

FOREIGN PATENT DOCUMENTS

| JP | 2007114007 | 10/2007 |
|----|------------|---------|
| WO | 2005124280 | 6/2004 |
| WO | 2008047449 | 10/2006 |
| WO | 2014188536 | 11/2014 |

* cited by examiner

FIG 2 - STEP 2

FIG 3 - STEP 3

AREA DISPLAY SYSTEM

CROSS-REFERENCE TO RELATED APPLICATIONS

This application is a U.S. National Phase Application under 35 U.S.C. 371 of International Application No. PCT/IL2017/051144, which has an international filing date of Oct. 16, 2017, and which claims priority and benefit from Israel Patent Application No. 248749, filed Nov. 3, 2016, the contents and disclosure of which are incorporated herein by reference in their entirety.

TECHNICAL FIELD

The invention relates to the field of visual information for the public. More particularly, the invention relates to a system for producing a real-time picture of areas.

BACKGROUND

"Google Earth" or similar projects and applications provide the public with photographs of various areas.

However, the photographs are not updated.

There is a long felt need to provide updated photographs.

SUMMARY

In one aspect, the invention is directed to an area display system (10), including:
  at least one flying camera (54), for producing a picture (56A) of at least one area (12A) for at least two specific times (40A, 40B);
  a social network geographical navigation application (60), for obtaining locations (16A2, 16C2) of objects (16A1, 16C1) via broadcasting smartphones (52A) thereof, roaming in the at least one area (12A); and
  a processor, for deleting regions (50A, 50B) from the picture (56A) being different in the at least two specific times (40A, 40B), and
  for inserting a symbol (16A3) for each of the roaming objects (16A1) into the picture (56A), conforming to the location (16A2) thereof.

DETAILED DESCRIPTION

Figure 1:
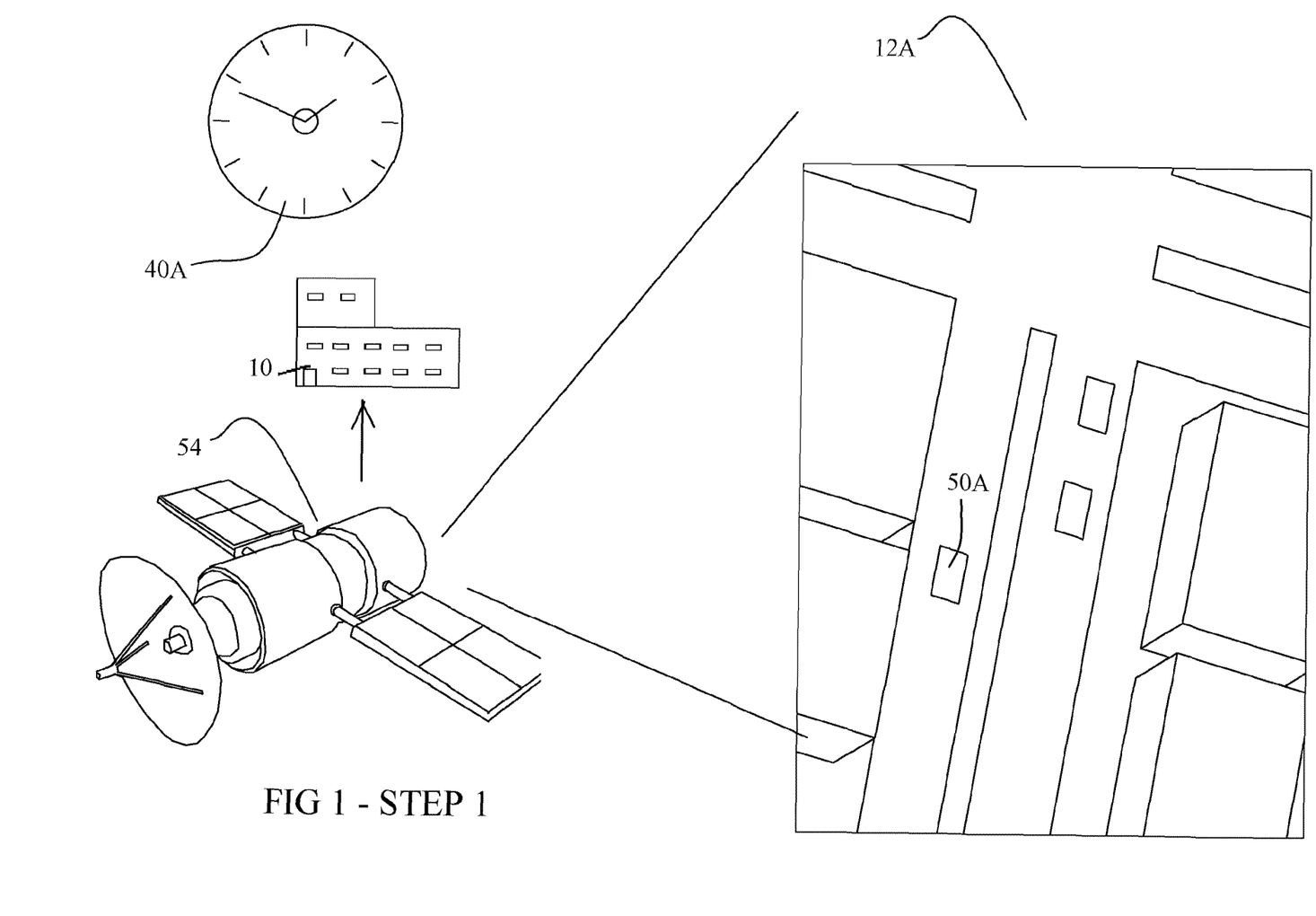
FIG. 1 depicts step 1 of producing a real-time-view by an area display system according to one embodiment of the invention.

FIG. 1 depicts step 1 of producing a real-time-view by an area display system according to one embodiment of the invention.

At step 1, a satellite 54 captures an area 12A at a first specific time 40A, and satellite 54 reports it to an area display system 10, of the invention.

Figure 2:
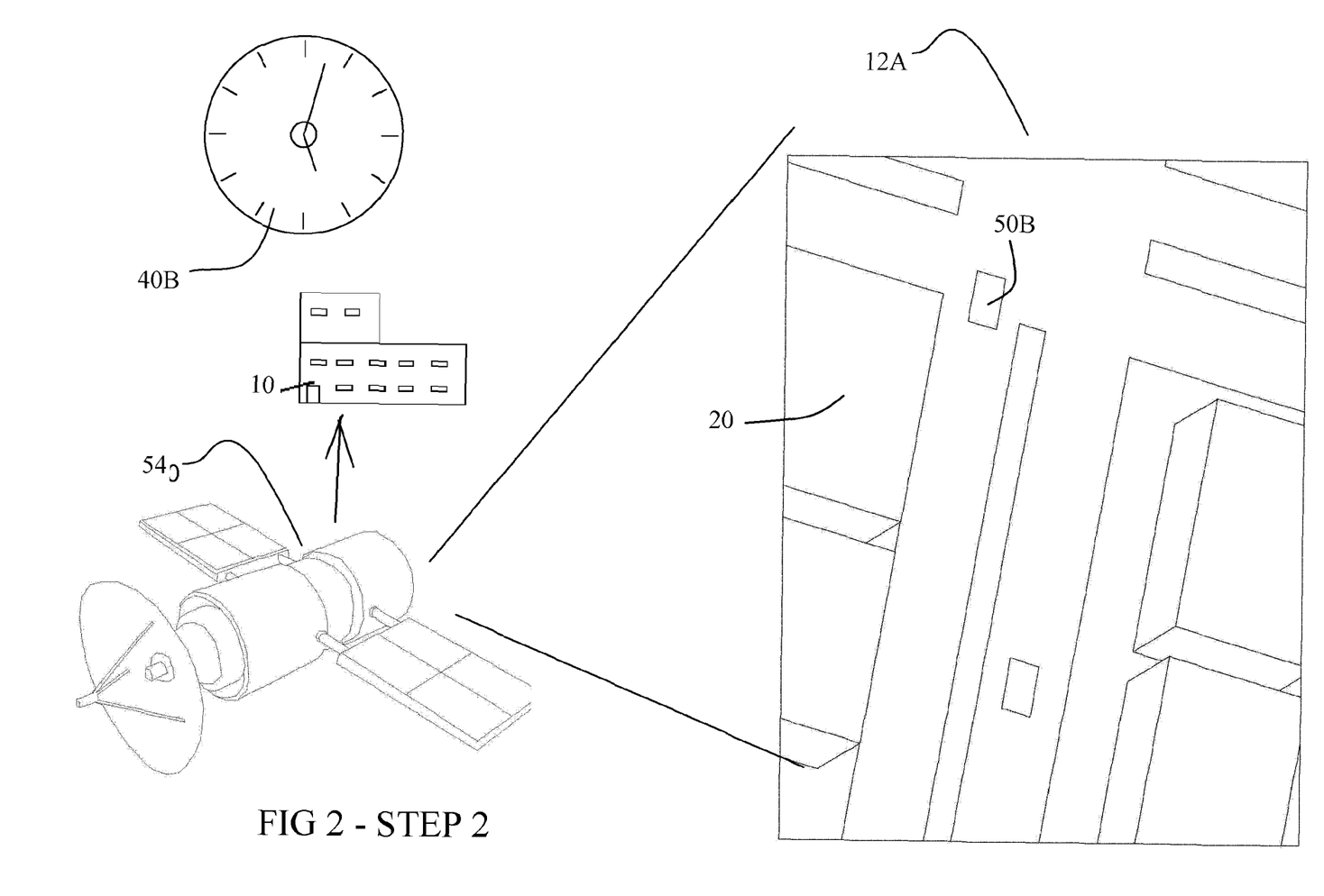
FIG. 2 depicts step 2 of producing the real-time-view by the area display system of FIG. 1.

FIG. 2 depicts step 2 of producing the real-time-view by the area display system of FIG. 1.

At step 2, satellite 54 captures the same area 12A at a second specific time 40B, and satellite 54 reports it to a area display system 10.

Figure 3:
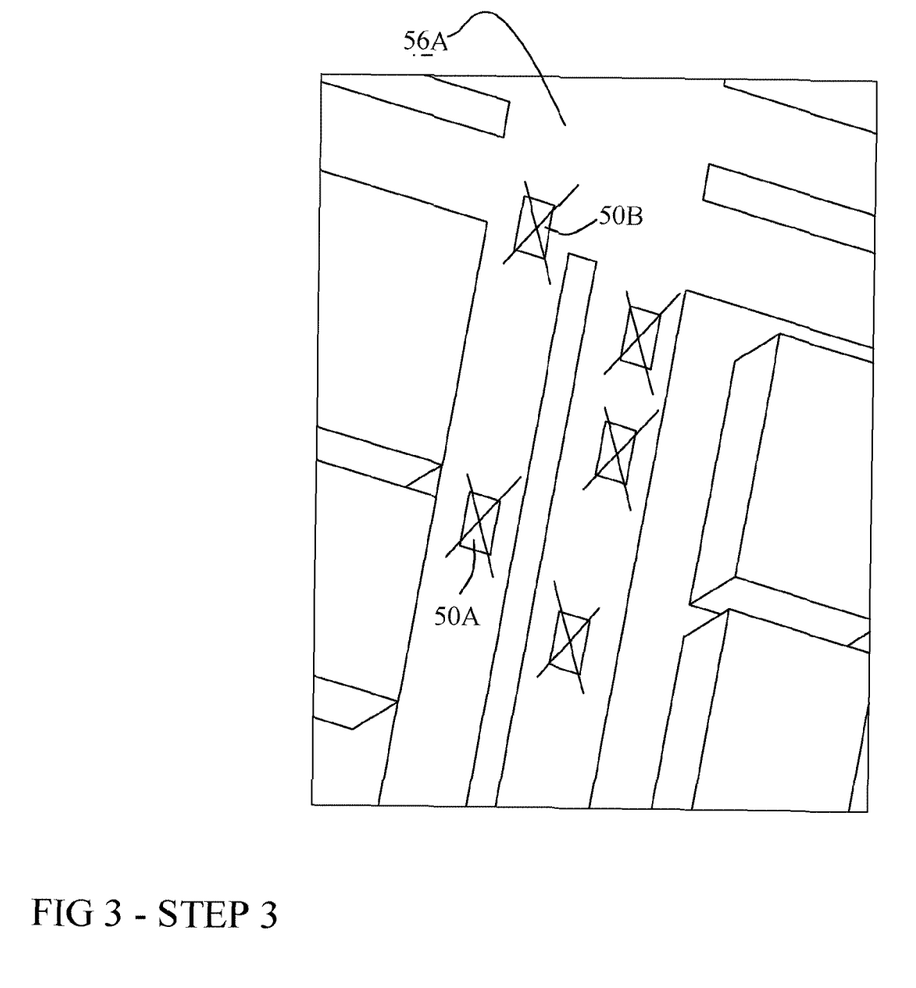
FIG. 3 depicts step 3 of producing the real-time-view by the area display system of FIG. 1.

FIG. 3 depicts step 3 of producing the real-time-view by the area display system of FIG. 1.

At step 3, area display system 10 compares the picture of FIG. 1 to that of FIG. 2, and produces a picture 56A, including the equal regions only, while deleting regions 50A, 50B and other regions, being different in the two pictures.

In practice these regions 50A and 50B are of historical non-relevant vehicles and other moving objects, which should not appear in the produced picture 56A.

Figure 4:
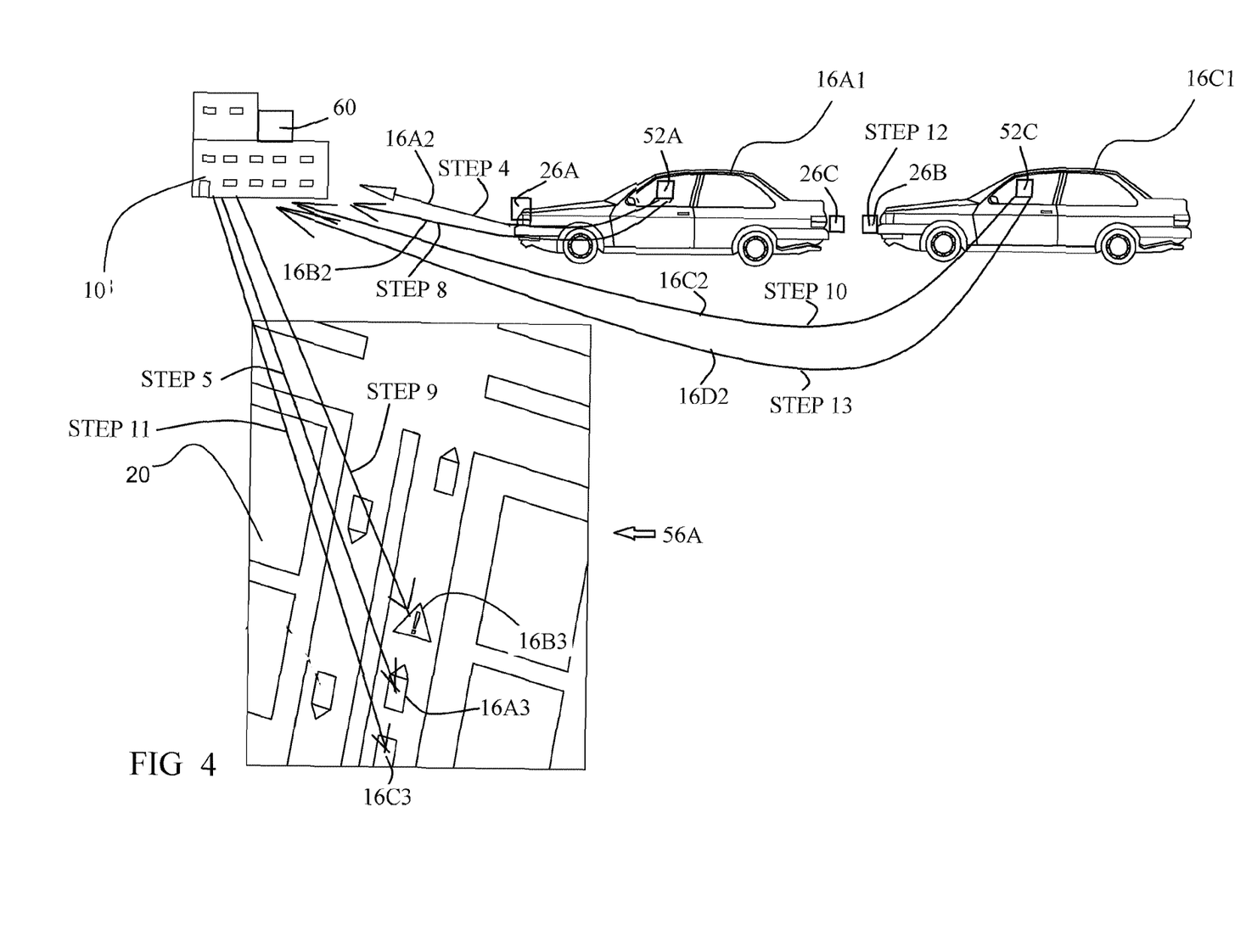
FIG. 4 depicts step 4 of producing the real-time-view by the area display system of FIG. 1.

FIG. 4 depicts step 4 of producing the real-time-view by the area display system of FIG. 1.

The term "social network geographical navigation application" refers herein to a geographical navigation application, receiving its information from broadcasting smartphones being members/users of a social network; WAYZ is a typical social network geographical navigation application.

At step 4, a smartphone 52A in a physical vehicle 16A1, being a member of a social network geographical navigation application 60, provides a broadcast 16A2 to area display system 10, regarding the location of vehicle 16A1.

At step 5, area display system 10 adds a symbol 16A3 of vehicle 16A1 into picture 56A, conforming to the reported location 16A2.

Thus, picture 56A constitutes an Augmented Reality picture, as it includes symbol 16A3 within the photograph of satellite 54.

Figure 5:
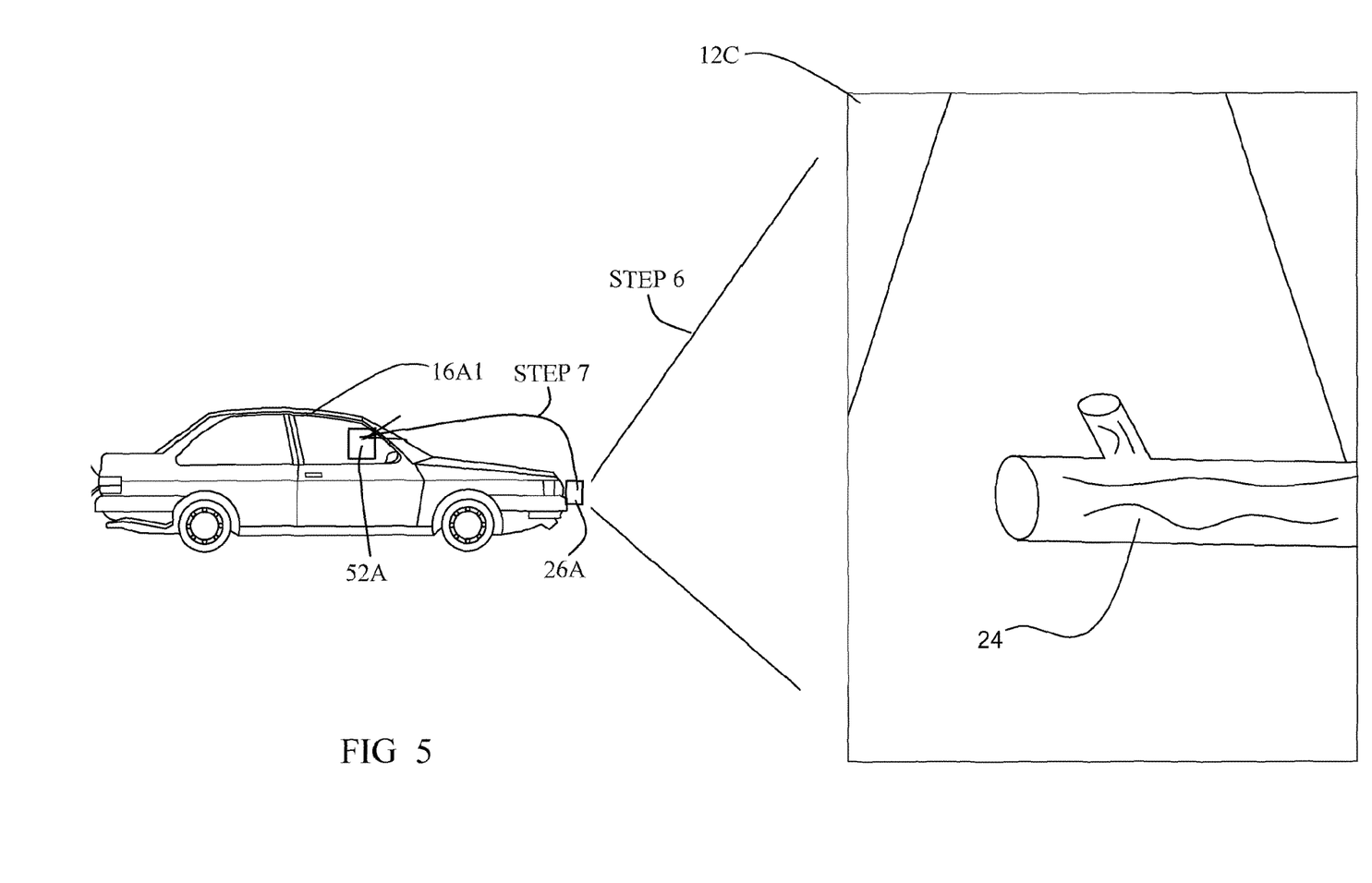
FIG. 5 depicts step 6 of producing the real-time-view by the area display system of FIG. 1.

FIG. 5 depicts step 6 of producing the real-time-view by the area display system of FIG. 1.

At step 6, a camera 26A of vehicle 16A1 captures an obstacle 24.

At step 7, camera 26A communicates the photograph of obstacle 24 to smartphone 52A.

At step 8, and referring again to FIG. 4, smartphone 52A provides a broadcast 16B2 to area display system 10, of the photograph of obstacle 24.

At step 9, area display system 10 adds the photograph of obstacle 24 of FIG. 5 into picture 56A as 16B3, conforming to the reported location 16A2. Then, area display system 10 adds a small correction, for moving photograph 16B3 from symbol 16A3.

At step 10, a smartphone 52C in a vehicle 16C1 provides a broadcast 16C2 to area display system 10, regarding the location of vehicle 16C1.

At step 11, area display system 10 adds a symbol 16C3 of vehicle 16C1 into picture 56A, conforming to the reported location 16C2.

At step 12, a camera 26B of vehicle 16C1 captures vehicle 16A1; and camera 26B communicates the photograph of vehicle 16A1 to smartphone 52C.

At step 13, smartphone 52C provides a broadcast 16D2 to area display system 10, of the photograph of vehicle 16A1.

Figure 6:
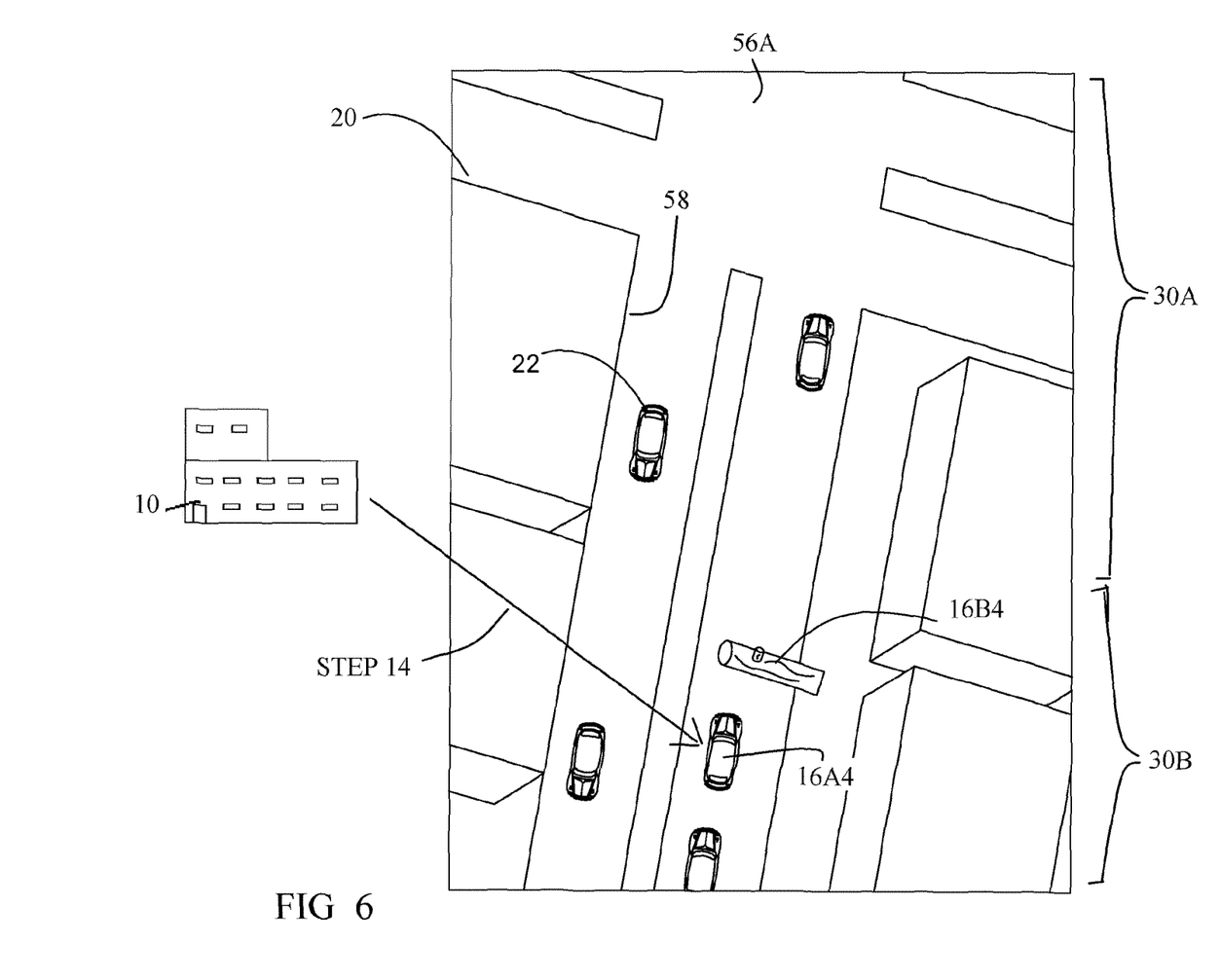
FIG. 6 depicts rotation of the objects.

FIG. 6 depicts step 14.

At step 14, area display system 10 adds the photograph of obstacle 24 of FIG. 5 into picture 56A, thus replacing symbol 16B3 with a photograph 16B4.

Houses 20 of picture 56A are three-dimensional as being those provided by satellite 54 of FIG. 1.

Referring again to FIG. 4, vehicle 16A1 may have, except for front camera 26A, also a rear camera 26C, for photographing vehicle 16C1. Thus, each broadcasting of a photograph must include, further to the location of the camera, also the angle of the camera.

Figure 7:
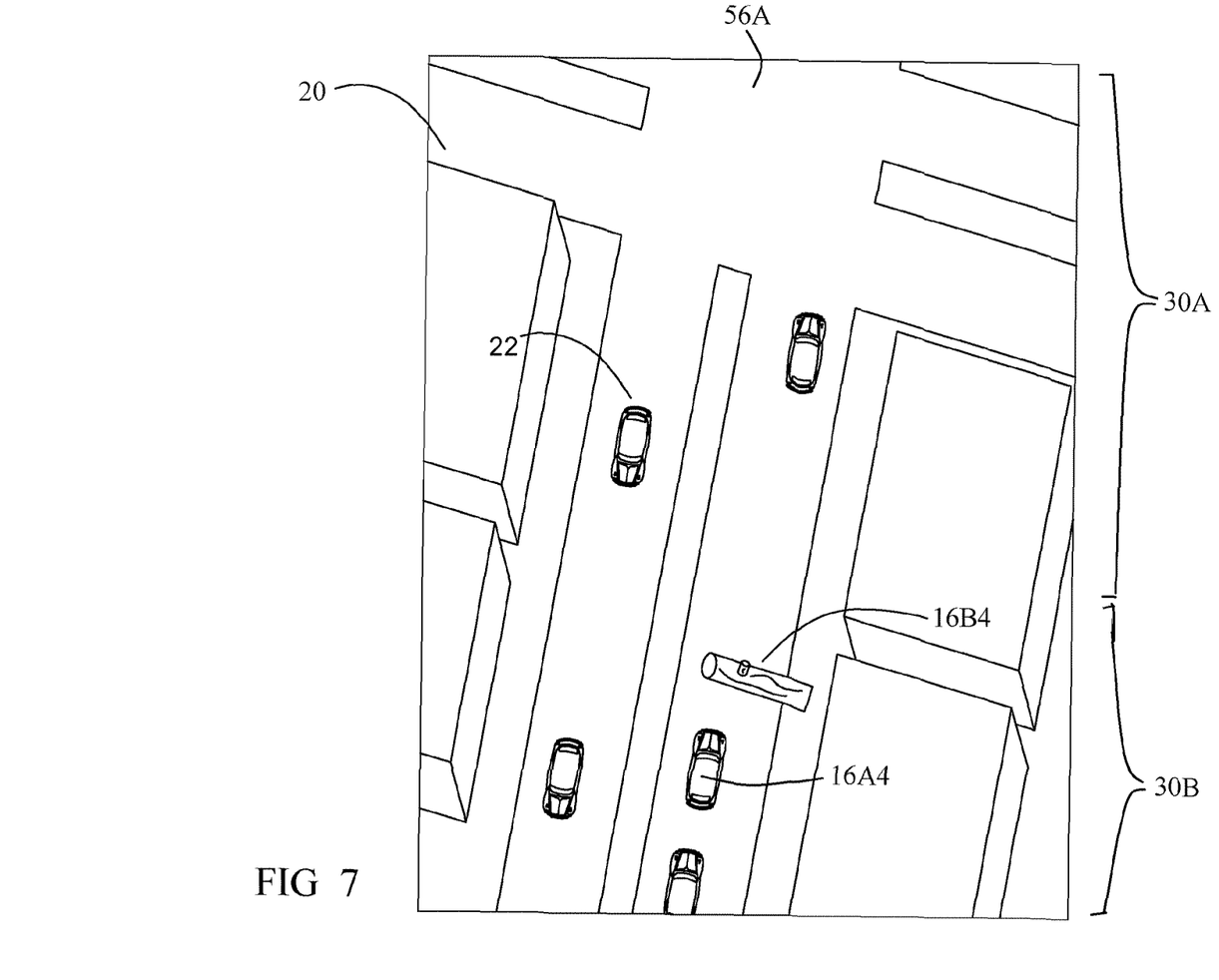
FIG. 7 is the same as FIG. 6, except for being in a different angle of view.

FIG. 7 is the same as FIG. 6, except for being in a different angle of view.

Area display system 10 collects captures of the stationary objects from satellite 54, such as of houses 20, from different angles, and includes image processing tools, for presenting picture 56A, as if it is viewed from different angles of view. For example wall 58 is not hidden in FIG. 7, and is hidden in FIG. 6.

Figure 8:
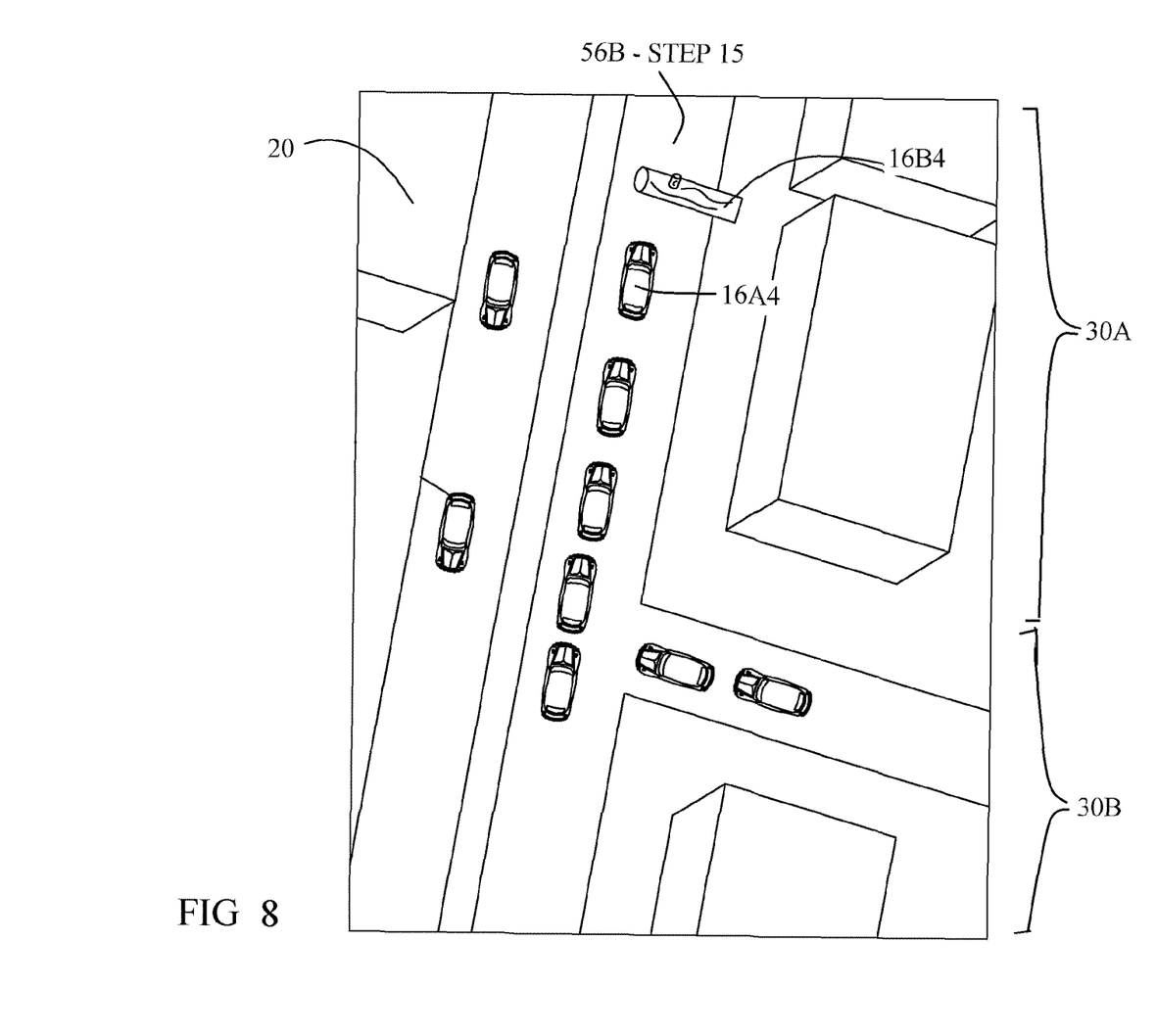
FIG. 8 is the same as FIG. 7, except for being shifted to a different area.

FIG. 8 is the same as FIG. 7, except for being shifted to a different area.

At step 15, picture 56B is produced by the same steps of producing picture 56A.

Part 30B of pictures 56A and 56B are equal; part 30C of picture 56B of FIG. 8 is not present in picture 56A.

Figures 9, 10:
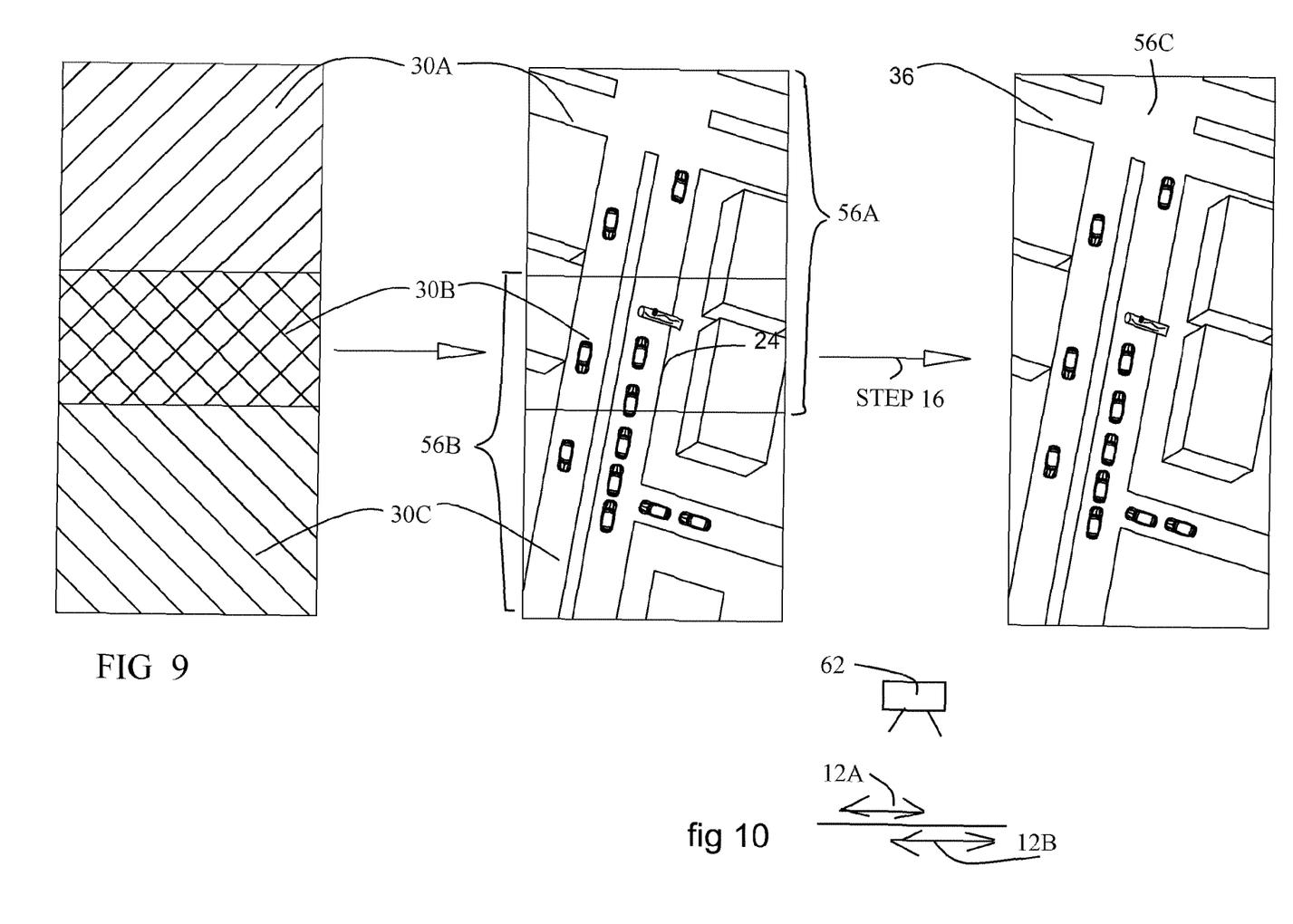
FIG. 9 depicts the combination of the pictures, produced by the previous steps.
FIG. 10 depicts the function of the system of FIG. 1.

FIG. 9 depicts the combination of the pictures, produced by the previous steps.

At step 16, area display system 10 combines pictures 56A and 56B to a picture 56C, by overlapping the equal parts 30B of both.

Thus, a user, being any person receiving service from area display system 10, may select any of pictures 56A, 56B, or 56C, each in different angles.

FIG. 10 depicts the function of the system of FIG. 1.

Thus, system 10 simulates a virtual flying camera 62, being controlled by the user, for selecting area 12A, 12B or both together, for viewing.

Thus, the invention is directed to an area display system (10), including:
- at least one flying camera (54), for producing a picture (56A) of at least one area (12A) for at least two specific times (40A, 40B);
- a social network geographical navigation application (60), for obtaining locations (16A2, 16C2) of objects (16A1, 16C1) via broadcasting smartphones (52A) thereof, roaming in the at least one area (12A); and
- a processor,
  - for deleting regions (50A, 50B) from the picture (56A) being different in the at least two specific times (40A, 40B), and
  - for inserting a symbol (16A3) for each of the roaming objects (16A1) into the picture (56A), conforming to the location (16A2) thereof.

The area display system (10) may further include:
- at least one camera (26B) attached to an object (16C1) of the objects (16A1, 16C1), for providing at least one photograph (16D2) of another object (16A1) of the objects (16A1, 16C1), to the social network geographical navigation application (60),
- thereby the at least one photograph (16D2) is associated with a location (16C2) of the locations (16A2, 16C2) of the other object (16A1),
- thereby the symbol (16A3) is replaceable with the at least one photograph (16D2).

The at least one photograph (16D2) of the other object (16A1), provided to the social network geographical navigation application (60), may further be associated with an angle of view of the at least one camera (26B) in relation to the object (16C1) attached thereto,
thereby improving accuracy of the location (16C2) of the other object (16A1).

The at least one area (12A) may include at least two adjacent areas (12A, 12B), each for producing a picture (56A, 56B) thereof, and
wherein the processor is further for producing a picture (56C) combining the pictures (56A, 56B) of the at least two adjacent areas (12A, 12B),
thereby allowing viewing the at least two adjacent areas (12A, 12B) either alone or combined.

Numeral 10 denotes the area display system according to one embodiment of the invention;
numerals 12A, 12B and 12C denote physical areas;
numerals 16A1 and 16C1 denote physical vehicles, or other roaming physical objects;
numerals 16B2 and 16D2 denotes broadcasts of photographs;
numerals 16A3, 16B3 and 16B3 denote symbols of objects, inserted into the picture;
numerals 16A4 and 16B4 denote broadcasted photographs, inserted into the picture, for replacing symbols;
numeral 16C2 denotes a broadcast of a location;
numeral 20 denotes a stationary object, such as a house;
numeral 24 denotes a physical obstacle or any other physical reported object;
numerals 26A, 26B and 26C denote cameras;
numerals 30A, 30B and 30C denote parts of pictures;
numerals 40A and 40B denote specific times;
numerals 50A and 50B denote regions deleted from the picture;
numerals 52A and 52C denote smartphones;
numeral 54 denotes a flying camera, such as of a satellite;
numerals 56A, 56B and 56C denote pictures produced by the system;
numeral 58 denotes a wall;
numeral 60 denotes a social network geographical navigation application;
numeral 62 denotes a virtual flying camera, for servicing a user;

The reference numbers should not be interpreted as limiting the claims in any form.

What is claimed is:

1. An area display system, comprising:
    at least one flying camera, for producing a real picture of at least one area for two specific times;
    a social network geographical navigation application, for producing virtual pictures of said at least one area, each of said virtual pictures comprising locations of objects via broadcasting smartphones thereof, roaming in said at least one area at a certain time; and
    a processor,
       for deleting regions from said real picture being different in said at least two specific times, thereby deleting historical data, and
       for combining said real and each of said virtual pictures, by inserting symbols for all of said roaming objects into said real picture, conforming to said locations thereof,
       thereby said combined pictures comprise non-historical zones only of said real picture, plus all and only said symbols of said locations of said roaming objects changing as a function of time.

2. An area display system according to claim 1, further comprising:

at least one camera attached to an object of said objects, for providing at least one photograph of another object of said objects, to said social network geographical navigation application, thereby said at least one photograph is associated with a location of said locations of said other object, thereby said symbol is replaceable with said at least one photograph.

3. An area display system according to claim 2, wherein said at least one photograph of said other object, provided to said social network geographical navigation application, is further associated with an angle of view of said at least one camera in relation to said object attached thereto, thereby improving accuracy of said location of said other object.

4. An area display system according to claim 1, wherein said at least one area comprises at least two adjacent areas, each for producing a picture thereof, and wherein said processor is further for producing a picture combining said pictures of said at least two adjacent areas, thereby allowing viewing said at least two adjacent areas either alone or combined.

* * * * *